United States Patent [19]
van den Berg et al.

[11] 3,824,648
[45] July 23, 1974

[54] WINDSHIELD WIPER ASSEMBLY

[75] Inventors: Johan H. van den Berg; Alex H. A. Van Eekelen, both of Hasselt, Belgium

[73] Assignee: Monroe Belgium N.V., Sint-Truiden, Belgium

[22] Filed: Nov. 10, 1972

[21] Appl. No.: 305,529

[52] U.S. Cl. ............................................ 15/250.32
[51] Int. Cl. ............................................... B60s 1/40
[58] Field of Search....... 15/250.32, 250.35, 250.36, 15/250.42

[56] References Cited
FOREIGN PATENTS OR APPLICATIONS
748,933  5/1956  Great Britain................... 15/250.32

*Primary Examiner*—Peter Feldman
*Attorney, Agent, or Firm*—Harness, Dickey & Pierce

[57] ABSTRACT

A connector for operatively securing a windshield wiper blade assembly to selected of associated wiper arms having different size connecting end portions thereon, the connector including a body having means thereon for attaching the same to the blade assembly and defining a cavity having means therein defining first and second size areas adapted to receive corresponding size connecting end portions of selected wiper arms.

1 Claim, 4 Drawing Figures

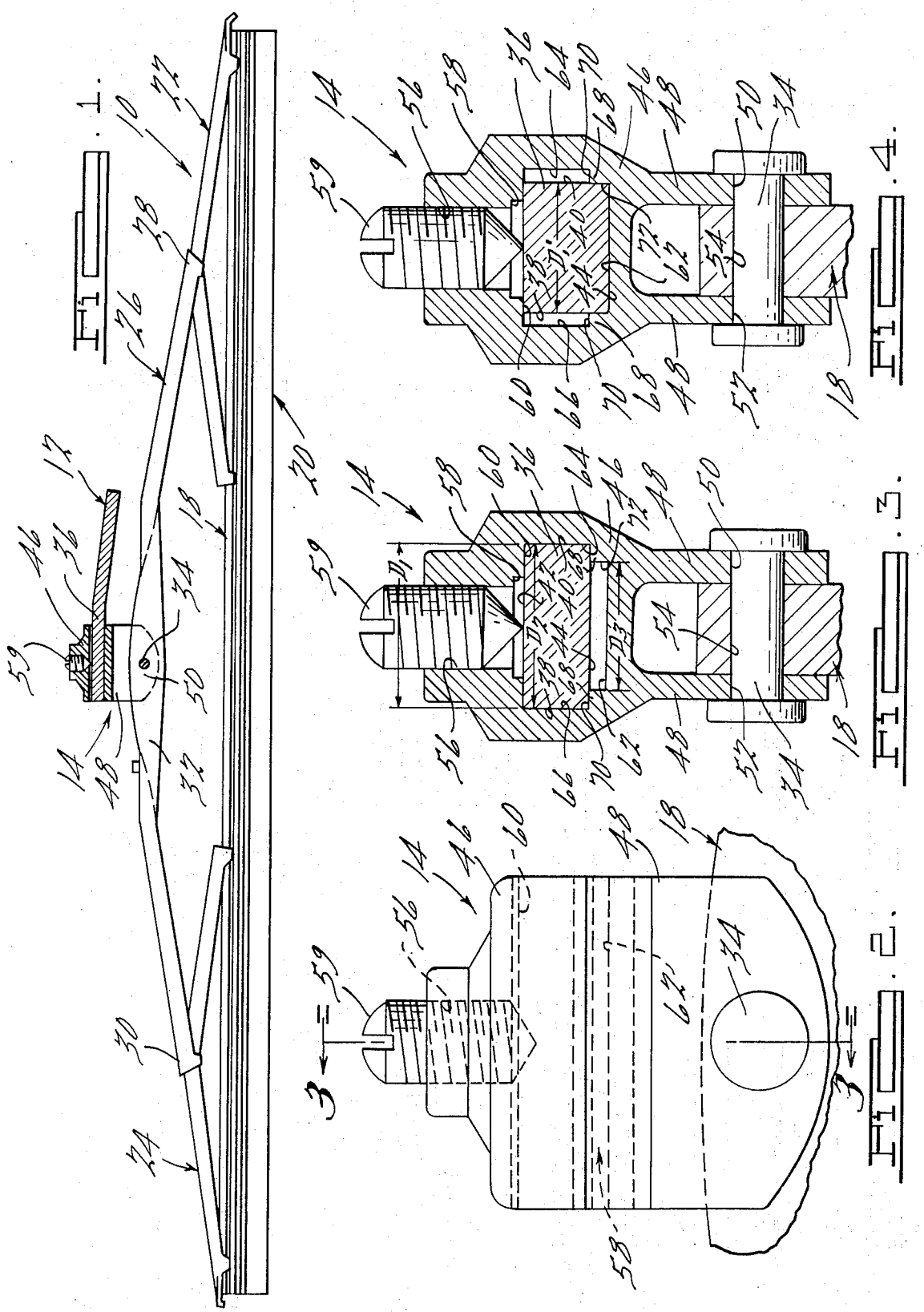

3,824,648

WINDSHIELD WIPER ASSEMBLY

SUMMARY OF THE INVENTION

The present invention generally relates to windshield wiper blades and more particularly, to a new and improved connector for use in operatively securing windshield wiper blade assemblies to associated wiper arms having connecting end portions of different cross sectional sizes.

It is accordingly a general object of the present invention to provide a new and improved windshield wiper assembly having a novel connector mounted thereon adapted for selective attachment to different size windshield wiper arms.

It is a more particular object of the present invention to provide a new and improved connector of the above character which defines a cavity adapted to removably receive the connecting end portion of an associated wiper arm, which cavity is formed with a series of step-shaped areas, of complimentary shape with respect to different size windshield wiper arms.

It is a further object of the present invention to provide a new and improved windshield wiper connector, as above described, which is of a simple design, is economical to manufacture and will have a long and effective operational life.

Other objects and advantages of the present invention will become apparent from the following description taken in conjunction with the accompanying drawing.

BRIEF DESCRIPTION OF THE DRAWING

FIG. 1 is a side elevational view of a conventional windshield wiper blade and associated arm, as shown in operative association with the new and improved connector of the present invention;

FIG. 2 is an enlarged side elevational view of the connector shown in FIG. 1;

FIG. 3 is a transverse cross sectional view taken substantially on the line 3—3 of FIG. 2 and shows the connector in operative association with a windshield wiper arm of predetermined cross sectional size, and FIG. 4 is a cross sectional view similar to FIG. 3 and shows the connector therein in operative association with a wiper arm of a different cross sectional size.

DESCRIPTION OF A PREFERRED EMBODIMENT

Referring now in detail to the drawing, a windshield wiper blade assembly, generally designated by the numeral 10, is shown in operative association with a windshield wiper arm 12. As is well known in the art, the assembly 10 is adapted to be mounted for concomitant reciprocal or pivotal movement with the arm 12 adjacent the surface of a vehicular windshield or the like, whereby to remove any accumulated moisture thereon. The arm 12, in accordance with the principles of the present invention, is operatively secured to the blade assembly 10 by means of a connector 14 which will hereinafter be described in detail, the connector 14 serving to fixedly secure the blade assembly 10 to the wiper arm 12, yet provide for convenient removal thereof for purposes of replacement, repair, etc.

Generally speaking, the blade assembly 10 comprises an elongated blade support member 18, which is adapted to operatively support a co-extensive resilient deformable wiping lip 20 that is adapted for engagement with the associated windshield (not shown). The support member 18 is secured to a pair of longitudinally spaced secondary yoke members 22 and 24 which are in turn secured to an elongated primary yoke member 26 having end portions 28 and 30 that are secured in a manner well known in the art to the secondary yoke members 22 and 24. The yoke member 26 comprises an intermediate section 32 which is spaced above the blade support member 28 and is operatively secured by a suitable rivet, screw, bolt, or other fastening element 34 to the connector 14 of the present invention. As illustrated, the wiper arm 12 comprises a generally rectangular shaped connection end portion 36 having spaced parallel side surfaces 38, 40, a top surface 42 and a bottom surface 44. By way of example, the side surfaces 38, 40 are spaced apart a distance $D_1$, for purposes hereinafter to be described.

Referring now in detail to the construction of the connector 14 of the present invention, as best seen in FIGS. 2 through 4, the connector 14 comprises a body 46 having a pair of spaced-apart leg sections 48 integrally formed on the underside thereof and depending downwardly therefrom. The leg sections 48 are adapted to extend downwardly along the opposite sides of the blade support member 18 and are formed with aligned transverse openings or apertures 50 and 52 which are adapted to be aligned with a suitable opening or aperture 54 within the blade support member 18, with the rivet, screw or the like 34 extending through the openings 50, 52 and 54 and thereby operatively securing the connector 14 to the blade assembly 10.

The upper end of the connector 14 is formed with a generally vertically disposed, internally threaded bore 56 that terminates at the lower end thereof in a cavity 58, which extends entirely through the body 46. Disposed within the bore 56 is an externally threaded screw or similar type fastening element, generally designated by the numeral 59, which is adapted to be threadably advanced upwardly and downwardly within the bore 56 for selectively securing and releasing the connecting end portion 36 of the wiper arm 12 within the cavity 58, as will hereinafter be described.

The cavity 58 is defined by a generally flat upper surface 60 and by a lower surface 62 which is disposed below the surface 60 and arranged generally parallel thereto. In addition, the cavity 58 is defined by a pair of generally step-shaped side surfaces 64 and 66 that extend between the surfaces 60, 62. As best seen in FIGS. 3 and 4, the side surfaces 64, 66 are formed with inwardly projecting shoulder portions 68 at the lower end thereof, which portions 68 are in turn defined by horizontal surfaces 70 lying in a common horizontal plane and by vertical surfaces 72 which are spaced laterally inwardly from the plane of the surfaces 64, 66. As seen in FIG. 3, the lateral distance between the surfaces 72 of the shoulder 68 is defined by the dimension $D_3$, whereas the lateral dimension between the side surfaces 64, 66 of the cavity 58 is defined by the dimension $D_2$. The dimension $D_2$ is selected so as to be approximately equal to the dimension $D_1$ which is the lateral width of the connecting end portion 36 of the wiper arm 12. Accordingly, at such time as the end portion 36 is inserted into the cavity 58, the fastening element 59 may be threadably advanced downwardly into engagement with the upper surface 42 of the end portion 36, whereby the end portion 36 is confined against upward and downward movement between the horizontal surfaces 70 of the shoulder 68 and the underside of the element 59, and the end portion 36 is confined against relative lateral movement by being in contiguous engagement with the surfaces 64, 66 defining the sides of the cavity 58.

If the end portion 36 or the wiper arm 12 has a cross sectional size shown in FIG. 4 wherein the lateral width is defined by the dimension $D_1$, which dimension is equal to the dimension $D_3$ defined between the vertical surfaces 72 of the shoulder 68, the end portion 36, upon being inserted into the cavity 58, will be virtually confined between the underside of the element 59 and the surface 62 and will be confined laterally between the shoulders 68 and in particular, the vertical surfaces 72 thereof. Thus, it will be seen that the single connector 14 is adapted to be operatively secured to wiper arms having connecting end portions of different cross sectional sizes, and with either sized connecting end portion, the associated wiper arm will be fixedly secured against any relative movement within the connector 14. It will be appreciated, of course, that the cavity 58 may be formed with additional step-shaped sections, whereby to accommodate still further different cross sectional size end portions without departing from the scope or fair meaning of the present invention. Additionally, it will be appreciated that the shape of the inner periphery of the cavity 58 may assume various alternative configurations in defining two or more different cross sectional sized areas, whereby wiper arm connecting end portions of different cross sectional shapes may be accommodated therein.

While it will be apparent that the preferred embodiment illustrated herein is well calculated to fulfill the objects above stated, it will be appreciated that the present invention is susceptible to modification, variation and change without departing from the scope of the invention.

We claim:

1. A connector for operatively securing a windshield wiper blade assembly to selected of associated wiper arms having different size connecting end portions, said connector including a body having a pair of downwardly projecting spaced apart legs formed integrally of the connector for attaching the same to the blade assembly, and defining a cavity extending longitudinally of said body and adapted to receive the connecting end portions of selected wiper arms, said cavity being defined by a pair of longitudinally extending, transversely spaced apart side sections, and spaced apart upper and lower sections extending transversely between said side sections, said lower section defining a first support surface lying in a first imaginary plane extending transversely of said cavity a first predetermined width, said side sections including step-shaped portions and defining a pair of coplanar support surfaces spaced transversely apart a second predetermined width and lying in a second imaginary plane spaced above and parallel to said first mentioned imaginary plane, said upper section being formed with a central interiorly threaded bore within which a threaded securing member is adjustably disposed, said upper surface also being formed with a pair of transversely spaced, laterally inwardly extending shoulders defining a pair of transversely spaced apart support surfaces lying in a third imaginary plane spaced above and parallel to said first and second imaginary planes, said last mentioned pair of support surfaces defined by said laterally spaced shoulders extending laterally inwardly from said side sections a sufficient distance to overlie both said first support surface and said first mentioned pair of support surfaces, whereby when a wiper arm of said first predetermined width is inserted into said cavity, the sides of said arm are engaged and supported laterally between said step-shaped portions, the lower side of said arm is engaged and supported by said first support surface, and the upper side of said arm is engaged and supported by said last mentioned pair of support surfaces, and when a wiper arm of said second predetermined width is inserted into said cavity, the sides of said arm are engaged and supported laterally between said side sections, the lower side of said arm is engaged and supported by said first mentioned pair of support surfaces, and the upper side of said arm is engaged and supported by said last mentioned pair of support surfaces.

* * * * *